Patented Oct. 20, 1936

2,057,906

UNITED STATES PATENT OFFICE 2,057,906

ARTIFICIAL SKATING RINK

Ernst Murmann, Feldsberg, Czechoslovakia, assignor of one-half to Christian Prell, Feldsberg, Czechoslovakia No Drawing. Application February 19, 1936, Serial No. 64,680. In Czechoslovakia May 23, 1935

7 Claims. (Cl. 106—33)

This invention relates to the production of compositions adapted to serve as a substitute for ice in making artificial skating rinks.

It has already been attempted to make an artificial ice skating rink from a composition containing carnauba wax as the main constituent. The first attempts failed owing to the fact that the composition showed a tendency, when poured out over large surfaces, to crack with the formation of fissures. This drawback was then combatted by the addition to the composition of solid pulverulent bodies such as talc, calcium carbonate, Montan wax, ceresin, and the like; but it was found that these additions had the effect of greatly increasing friction.

The essence of the present invention, by which the formation of cracks and fissures is prevented, and a light, ivory-like color obtained, is to fuse together the basic mass consisting of wax, with certain tar products. As the added constituent for the production of this fused mixture naphthalene is primarily contemplated, but it is also possible to use for this purpose fluorene, fluoranthene, pyrene, retene, phenanthrene, azenaphthene, naphthols, and naphthylamines. The fused mass is poured in any desired thickness on to a horizontal surface which is preferably first coated with a layer of paper. The tar products named have the property of separating out in the form of microscopically small crystals after the mixture has congealed and while it is still soft, whereby, as solid bodies, they prevent cracking and impart light color. After setting, the composition is brought up to a smooth surface by scraping and treatment with hot irons. Finally, for the purpose of reducing friction the surface is moistened with unmixed glycerine.

For the basic mass there are preferably used hard synthetic waxes in place of or in commixture with carnauba wax. More particularly the commercial artificial waxes known by the designations "S", "E", "O", "G 100", "G 140", and "S G", and produced by the firm of I. G. Farbenindustrie A. G., of Ludwigshafen a/Rhein, by esterification of Montan wax (from lignite) are well suited for the present purpose. Furthermore, the F. W. and Ester waxes, which are not yet commercially obtainable, are also suitable.

I claim:
1. The method of producing an artificial composition ice skating rink which consists in fusing together a mixture of synthetic hard wax and a tar product selected from the class comprising naphthalene, phenanthrene, azenaphthene, fluorene, fluoranthene, pyrene, retene, naphthalene, naphthols, and naphthylamines, and pouring out the fused mixture on an even horizontal surface.

2. A method as claimed in claim 1 in which the said mixture consists of 100 parts of the said wax and 40-100 parts of naphthalene.

3. A method of producing an artificial composition ice skating rink which consists in fusing together a mixture of synthetic hard wax, carnauba wax, and a tar product selected from the class comprising naphthalene, phenanthrene, azenaphthene, fluorene, fluoranthene, pyrene, retene, naphthols, and naphthylamines, and pouring out the fused mixture on a plane surface.

4. A method as claimed in claim 3 in which the said mixture consists of 100 parts in all of the said kinds of wax and 40-100 parts of naphthalene.

5. A method as claimed in claim 1 in which the said synthetic hard wax is selected from the class comprising the commercial waxes known by the designations "S", "E", "O", "G 100", "G 140", and "S G".

6. A method as claimed in claim 3 in which the said synthetic hard wax is selected from the class comprising the commercial waxes known by the designations "S", "E", "O", "G 100", "G 140", and "S G".

7. The method of producing an artificial composition ice skating rink which consists in fusing together a mixture containing synthetic hard wax and a tar product selected from the group comprising naphthalene, phenanthrene, azenaphthene, fluorene, fluoranthene, pyrene, retene, naphthols, and naphthylamines, pouring out the fused mixture on a plane surface, and coating the surface of the composition after setting with unmixed glycerine as an anti-friction agent.

ERNST MURMANN.